(12) United States Patent
Schultheiss et al.

(10) Patent No.: US 7,710,125 B2
(45) Date of Patent: May 4, 2010

(54) INDEPENDENT REFERENCE PULSE GENERATION

(75) Inventors: Daniel Schultheiss, Hornberg (DE);
Josef Fehrenbach, Haslach (DE);
Christoph Mueller, Oppenau (DE);
Bernhard Corbe, Schutterwald (DE)

(73) Assignee: Vega Grieshaber KG, Wolfach (DE)

( * ) Notice: Subject to any disclaimer, the term of this patent is extended or adjusted under 35 U.S.C. 154(b) by 155 days.

(21) Appl. No.: 11/779,522

(22) Filed: Jul. 18, 2007

(65) Prior Publication Data

US 2008/0024145 A1 Jan. 31, 2008

Related U.S. Application Data

(60) Provisional application No. 60/833,525, filed on Jul. 26, 2006.

(30) Foreign Application Priority Data

Jul. 26, 2006 (DE) .................. 10 2006 034 554

(51) Int. Cl.
*G01R 27/04* (2006.01)
(52) U.S. Cl. .................. 324/644; 324/629; 324/637
(58) Field of Classification Search .................. 324/644, 324/76, 629, 637
See application file for complete search history.

(56) References Cited

U.S. PATENT DOCUMENTS

| 3,320,613 | A | * | 5/1967 | Brault et al. | 342/189 |
|---|---|---|---|---|---|
| 3,422,428 | A | * | 1/1969 | Jensen | 342/80 |
| 5,675,259 | A | * | 10/1997 | Arndt et al. | 324/642 |
| 5,898,308 | A | * | 4/1999 | Champion | 324/643 |
| 6,225,943 | B1 | * | 5/2001 | Curley et al. | 342/137 |
| 6,504,793 | B2 | * | 1/2003 | Fuenfgeld | 367/99 |
| 7,307,582 | B2 | * | 12/2007 | Griessbaum et al. | 342/124 |
| 2005/0264441 | A1 | * | 12/2005 | Abrahamsson | 342/124 |
| 2007/0182621 | A1 | | 8/2007 | Fehrenbach et al. | |

FOREIGN PATENT DOCUMENTS

| DE | 10 2005 057 053 | 5/2007 |
|---|---|---|
| EP | 0955527 | 11/1999 |
| EP | 1562051 | 8/2005 |
| WO | 2007/062806 | 6/2007 |

\* cited by examiner

*Primary Examiner*—Timothy J Dole
*Assistant Examiner*—Farhana Hoque
(74) *Attorney, Agent, or Firm*—Fay, Kaplun & Marcin, LLP

(57) ABSTRACT

In fill-level measuring devices according to the pulse-transit-time method, a reflection that is generated internally in a microwave module is used as a reference for transit time measuring. For generating the reference pulse, the microwave module comprises its own sampling mixer or its own oscillator. Subsequently, the echo signal and the reference pulse can be further processed separately or together. No delay line is necessary on the transmission frequency of the radar sensor. Interference as a result of leakage signals is largely prevented.

18 Claims, 5 Drawing Sheets

INDEPENDENT REFERENCE PULSE GENERATION

REFERENCE TO RELATED APPLICATIONS

This application claims the benefit of the filing date of DE Patent Application Serial No. 10 2006 034 554.1 filed Jul. 26, 2006 and U.S. Provisional Patent Application Ser. No. 60/833,525 filed Jul. 26, 2006, the disclosure of which applications is hereby incorporated herein by reference.

FIELD OF THE INVENTION

The present invention relates to fill level measuring. In particular, the present invention relates to a microwave module for independently generating a reference pulse for a fill-level measuring device, to a fill-level measuring device for determining a fill level in a tank, to the use of such a microwave module for fill level measuring, and to a method for independent reference pulse generation.

BACKGROUND INFORMATION

In fill-level measuring devices according to the pulse transit-time method, a reflection that has been generated internally in a microwave module is used as a reference for transit time measuring.

The stability of this internally generated reflection as far as amplitude, shape and location are concerned is decisive to the accuracy of the measuring device, because any change may result in a shift in the reference (zero point).

In hitherto known fill-level measuring devices the reference pulse is obtained from a mixture of different reflections. These individual reflections arise, for example, by way of the antenna input, the plug-and-socket connections at the microwave module, the transition from the printed circuit board to coaxial lines or waveguides, as well as by way of leakage signals in the transmitter-receiver filter circuit (e.g. in the directional coupler or in the circulator). Furthermore, by superposition with very large echoes of a product contained in a container, the shape of the reference pulse may change to such an extent in the region of the antenna that inaccuracies may occur.

By inserting lines between different circuit components, wherein the length of the lines corresponds at least to the resolution of the fill level radar, different reflections may be better separated from each other.

In order to reduce any influencing as a result of echoes at short range, a line with the length of a transmission pulse (corresponds approximately to the resolution of the sensor) can be used between the transmitter-receiver filter circuit and the transition from the microstrip line to the coaxial line. Likewise, a piece of coaxial line can be used between this transition and the waveguide coupling.

However, the influence which the remaining reflections have on the reference pulse may remain in this arrangement. If, for example, the insulation of the transmitter-receiver filter circuit changes over temperature, this also may affect the reference pulse and thus the measured value.

A further option for obtaining the reference pulse may consist of coupling out part of the signal already significantly earlier in the circuit and, by way of a directional coupler, feeding said part of the signal into the mixer. However, generally speaking, this may require delaying the transmission signal so that the undesired reflections can reliably be separated from the purposefully obtained reference signal. However, in this arrangement the transit time line may have relatively large attenuation, which may have to be compensated for by means of an amplifier. This may result in increased current consumption by the microwave module.

SUMMARY OF THE INVENTION

According to an exemplary embodiment of the present invention, a microwave module for independent reference pulse generation for a fill-level measuring device is stated, which microwave module comprises an echo signal unit for providing an echo signal, and a reference-pulse generating unit for generation of a reference pulse, wherein the reference pulse and the echo signal are signals that are separate from each other, and wherein the reference-pulse generating unit comprises its own first sampling mixer or its own oscillator.

The echo signal and the reference pulse are thus signals that are independent of each other, which signals can undergo further processing separately from each other. For example, for this purpose the reference-pulse generating unit comprises a separate sampling mixer which is used for reducing or lowering the reference signal to an intermediate frequency. In another exemplary embodiment the reference-pulse generating unit comprises a separate oscillator whose sole purpose it is to generate the reference pulse. The reference pulse may thus be independent of leakage signals on the transmitter-receiver filter circuit, which leakage signals may occur on a circulator or on a directional coupler as a result of inadequate insulation.

Furthermore, the reference pulse may be independent of reflections that can arise between the transmitter-receiver filter circuit and the antenna. Moreover, the reference pulse may be independent of large echoes at short range, which echoes may result in overload effects in the sampling mixer. There may be no need to provide a delay line on the transmission frequency of the radar sensor, which delay line, due to the large attenuation, may require a transmission amplifier.

According to a further exemplary embodiment of the present invention, the microwave module further comprises a second sampling mixer in the echo signal unit and a first drawing-off device (tapping device) in the reference-pulse generating unit, wherein the second sampling mixer is designed for converting a receiving signal to the echo signal in the form of a first intermediate-frequency signal (ZF signal). The first drawing-off device is designed to decouple a reference signal from a transmission path for a transmission signal, wherein the transmission path is arranged between a first oscillator and an antenna or probe of the fill-level measuring device. The first sampling mixer is designed to convert the decoupled reference signal to the reference pulse in the form of a second intermediate-frequency signal (ZF signal).

Two separate sampling mixers are thus provided. The first sampling mixer is used for converting the decoupled reference signal, while the second sampling mixer is used for converting the receiving signal.

According to a further exemplary embodiment of the present invention, the microwave module further comprises an adjustable attenuation device for varying the transmitting power of the transmission signal, wherein the adjustable attenuation device is arranged in the transmission path.

The transmitting power may thus be varied.

According to a further exemplary embodiment of the present invention, the microwave module further comprises a power divider for distributing a sampling pulse to the two sampling mixers.

In this way only a single oscillator may be required for generating the sampling pulse.

According to a further exemplary embodiment of the present invention, the microwave module further comprises a first memory for storing the echo signal, and a second memory for storing the reference pulse. The first memory and the second memory are separate from each other, but they may be arranged on the same chip.

In a further exemplary embodiment, the microwave module comprises a memory in which both the reference pulse and the echo signal are stored. For example, to this effect the echo signal is masked at the position of the reference pulse, and is replaced by the reference pulse. For this purpose an analog-digital converter is first switched to the reference pulse by means of a changeover switch. After sampling said reference pulse the changeover switch is changed over to the echo signal. This changeover may have to take place before the beginning of the actual measuring region so that no data is lost.

Another option consists of using two separate analog-digital converters which one after another write their digitalised values to a memory. In this arrangement the first analog-digital converter only samples the reference pulse, while the second analog-digital converter only samples the echo signals. In this way changing over the intermediate-frequency signals may not have to be performed.

According to a further exemplary embodiment of the present invention, the microwave module further comprises a changeover switch and an intermediate-frequency amplifier, wherein the changeover switch is designed to transmit the echo signal and the reference pulse to the intermediate-frequency amplifier.

Only a single intermediate-frequency amplifier may thus be necessary.

According to a further exemplary embodiment of the present invention, the microwave module further comprises a first amplifier for amplifying the transmission signal, wherein the first amplifier is arranged downstream of the first drawing-off device in the transmission path.

In addition or as an alternative to the adjustable attenuation device, this first amplifier can be inserted between the filter and the directional coupler, or between the coupler and the transmitter-receiver filter circuit. This may make it possible to effectively vary the transmitting power in order to prevent overload in the case of reflective media and/or at short range.

According to a further exemplary embodiment of the present invention, the microwave module further comprises a second drawing-off device, wherein the first amplifier is arranged upstream of the first drawing-off device in the transmission path, and wherein the second drawing-off device is designed for distributing the sampling pulse to the two sampling mixers.

Thus by way of the coupling attenuation devices of the two directional couplers the reference pulse may be selected so as to be sufficiently large, and the actual sampling pulse may be selected so as to be sufficiently small, for sampling to be quasi reversed, i.e. so that the decoupled part of the transmission pulse samples the decoupled part of the sampling pulse.

According to a further exemplary embodiment of the present invention, the microwave module further comprises a first rectifier for rectifying the decoupled reference signal, and a second rectifier for rectifying the sampling pulse, wherein both rectifiers are arranged upstream of the first sampling mixer.

This may result in a simple design of the sampling mixer and of the intermediate-frequency amplifier.

According to a further exemplary embodiment of the present invention, the rectifiers are designed as detectors.

Furthermore, according to a further exemplary embodiment, the microwave module can comprise a second oscillator for generating the reference pulse, and a delay device for delaying the transmission signal on its way to the antenna or probe.

The echo signal and the reference pulse have been separated in time to such an extent that the reference pulse may be evaluated without the influence of interference.

According to a further exemplary embodiment of the present invention, the delay device is designed as a simple line in a multilayer printed circuit board. Such a delay line may be manufactured in a simple manner.

According to a further exemplary embodiment of the present invention, the drawing-off devices are designed as directional couplers.

The directional couplers are, for example, designed as symmetrical or non-symmetrical hybrid couplers.

Such a hybrid coupler may be economically integrated in a circuit of the microwave module.

According to a further exemplary embodiment of the present invention, a fill-level measuring device for determining a fill level in a tank is stated, which fill-level measuring device comprises a microwave module as described above.

According to a further exemplary embodiment of the present invention, the use of such a microwave module for fill level measuring is stated.

Furthermore, a method for independently generating a reference pulse for a fill-level measuring device is stated, in which method an echo signal is provided, and a reference pulse is generated by its own first sampling mixer or its own oscillator, wherein the reference pulse and the echo signal are signals that are separate from each other.

In this way a method may be provided, by way of which interference to the reference pulse may be effectively reduced.

Further exemplary embodiments and advantages of the invention are stated in the subordinate claims.

Below, exemplary embodiments of the present invention are described with reference to the figures.

DETAILED DESCRIPTION OF EXEMPLARY EMBODIMENTS

Figure 1:
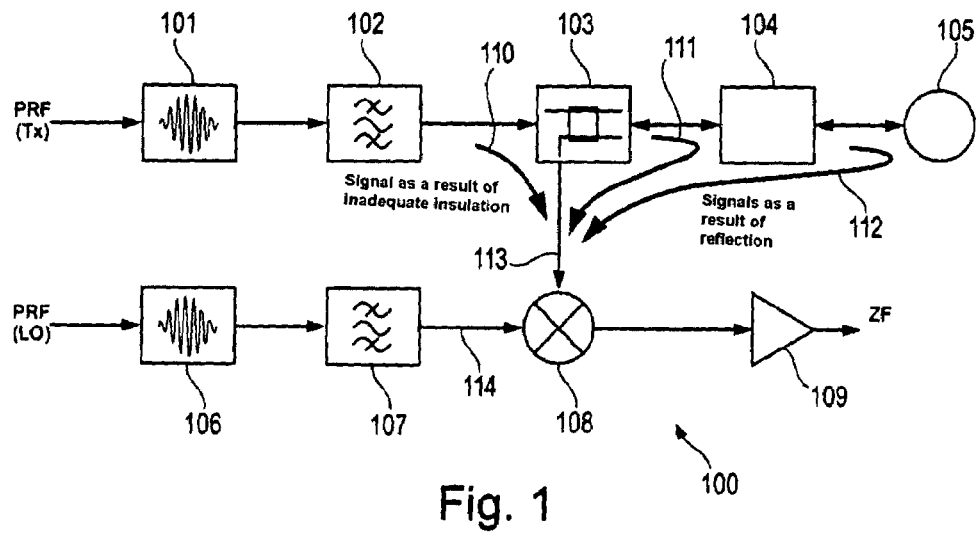
FIG. 1 shows a block diagram of a microwave module.

The views in the figures are diagrammatic and not to scale.

In the following description of the figures the same reference characters are used for identical or similar elements.

FIG. 1 shows a block diagram of a microwave module 100 with the reflections 110, 111, 112 which arise therein and which together form the reference pulse.

The microwave module 100 comprises an oscillator or pulse generator 101 for generating a transmission signal which subsequently passes through the filter 102. Furthermore, a transmitter-receiver filter circuit 103 is provided through which the transmission signal passes. Subsequently the transmission signal reaches the transition 104 between the microstrip and the coaxial line and then reaches the waveguide coupling 105 that leads to the antenna (not shown in FIG. 1).

The transmission signal is then emitted from the antenna, is reflected from the product contained in the container, and is received by the antenna. Said transmission signal then returns to the transmitter-receiver filter circuit 103 and is then forwarded to the mixer 108.

Due to inadequate insulation of the transmitter-receiver filter circuit 103, a signal 10 of the transmission signal is made to branch off on its way to the antenna and is also fed to the mixer 108. Likewise, interfering reflections 111, 112 are fed to the mixer 108.

The pulse generator 106 generates a sampling pulse, which is subsequently filtered in the filter 107, and is then also fed to the mixer 108. In the sampling mixer 108, the receiving signal 113 with the sampling pulse 114 is converted in the intermediate-frequency region and is subsequently amplified by intermediate-frequency amplifiers 109.

Figure 2:
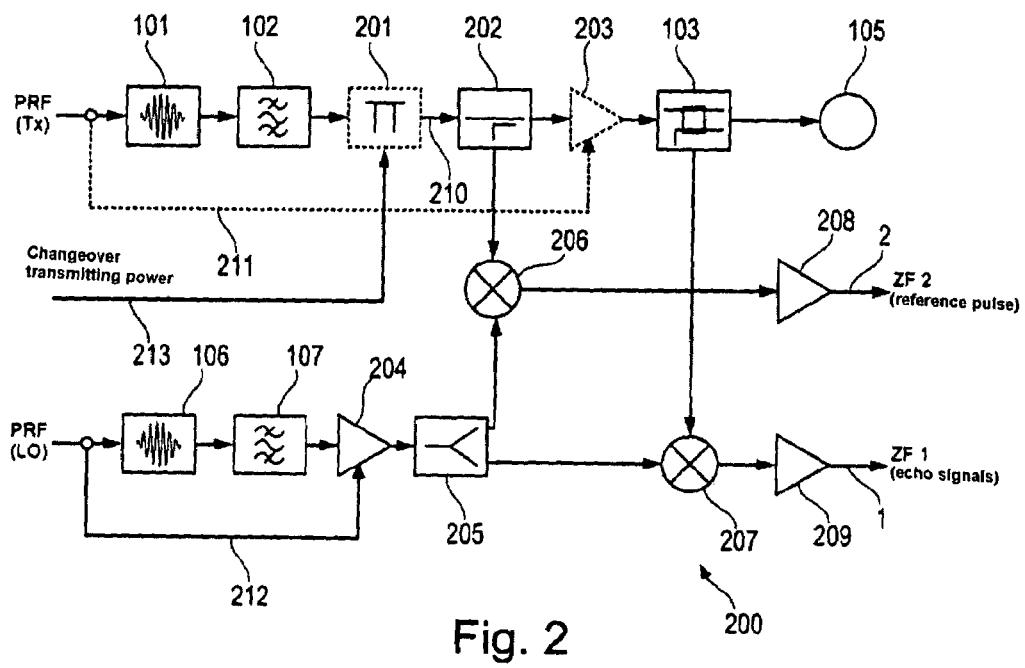
FIG. 2 shows a block diagram of a microwave module according to an exemplary embodiment of the present invention.

FIG. 2 shows a block diagram of a microwave module 200 according to an exemplary embodiment of the present invention. In this arrangement the microwave module 200 comprises in particular an adjustable attenuation device 201, a directional coupler 202, an amplifier 203, a further amplifier 204, a power divider 205, two sampling mixers 206, 207 and an additional intermediate-frequency amplifier 208.

After filtering in the filter 102, a transmission pulse 101 generated in the pulse generator 101 is fed to the directional coupler 202. In that location, part of said transmission pulse is decoupled and together with the sampling pulse in the first sampling mixer 206 is placed down into the intermediate-frequency region.

The additional adjustable attenuation device 201 between the filter 102 and the directional coupler 202, or between the directional coupler 202 and the amplifier 203, in addition makes it possible to vary the transmitting power in order to prevent overload in the case of reflective media and/or at short range. Setting the attenuation device takes place, for example, by way of a microcontroller via the control line 213.

Just like the transmission pulse, the sampling pulse is generated in a pulse generator 106 and is subsequently filtered through the filter 107. If required this signal can additionally be amplified by way of the amplifier 204 before a power divider 205 distributes it to the two sampling mixers 206, 207.

The larger part of the transmission pulse passes through the directional coupler 202 and if required is additionally amplified in an optionally present amplifier 203 before it passes through the transmitter-receiver filter circuit 203 and the waveguide coupling 105 to the antenna, from where it is emitted in the direction of the surface of the product contained in a container. The signal that is reflected from the surface of the product contained in the container is received by the antenna and then by way of the waveguide coupling 105 and the transmitter-receiver filter circuit reaches the receiving branch of the microwave module. There, with the sampling pulse, in the sampling mixer 207, said signal is converted to the intermediate-frequency region and subsequently amplified by way of the intermediate-frequency amplifier 209.

Furthermore, an additional intermediate-frequency amplifier 208 is provided for amplifying the reference pulse, which is, for example, arranged downstream of the first sampling mixer 206.

By means of this arrangement, a signal is obtained on the intermediate-frequency output 1, which signal comprises leakage signals and reflections on transitions and couplings as well as the echoes from the product contained in the container. This intermediate-frequency signal corresponds to the signal as is to be expected in prior art.

Furthermore, at the intermediate-frequency output 2 a reference signal is obtained that is free of any interference.

The two signals obtained in this way are each amplified once more (by way of the amplifier 209 or the amplifier 208), before they are, for example, in each case fed to an analog-digital converter and are, for example, stored in separate memories for the purpose of evaluation.

As an alternative to the above, the two intermediate-frequency signals (reference pulse and echo signal) may also be stored in the same memory. To this effect instead of the reference pulse, the intermediate-frequency signal 1 is masked and is replaced by the reference pulse intermediate signal 2.

The two amplifiers 203 and 204 can be switched on and off by way of the two lines 211 and 212. In the present case they are switched with the input clock pulse signal (PRF) of the two pulse oscillators, and in this way are switched on only if an input signal is indeed present. As a result of this the energy consumption of the two amplifiers can be reduced to a minimum.

Figure 3:
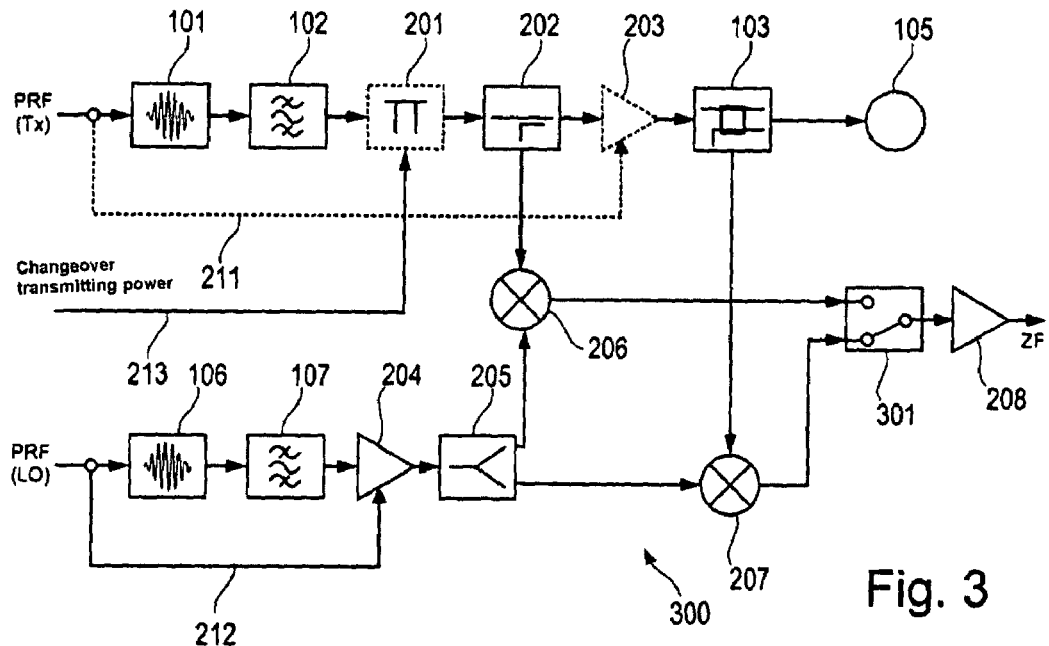
FIG. 3 shows a block diagram of a microwave module according to a further exemplary embodiment of the present invention.

FIG. 3 shows a block diagram of a microwave module 300 according to a further exemplary embodiment of the present invention. The microwave module 300 comprises a changeover switch 301.

The two signals coming from the sampling mixers 206, 207 are fed by way of the changeover switch 301 to a single intermediate-frequency amplifier 208. In this process the point in time when the changeover takes place may depend on further processing. If it is intended to further process the two signals separately, then in each case a complete sampling cycle must be awaited; if after analog-digital conversion the two signals are to be stored in a common memory (not shown in FIG. 3), then the changeover switch for the intermediate-frequency signals is first switched to the reference pulse and as soon as said reference pulse has finished, is switched to the echo curve. However, this changeover point must be prior to commencement of the measuring range so as avoid loss of information.

By means of this measure subsequent expenditure may be reduced to one analog-digital converter or to one receiver circuit.

Figure 3A:
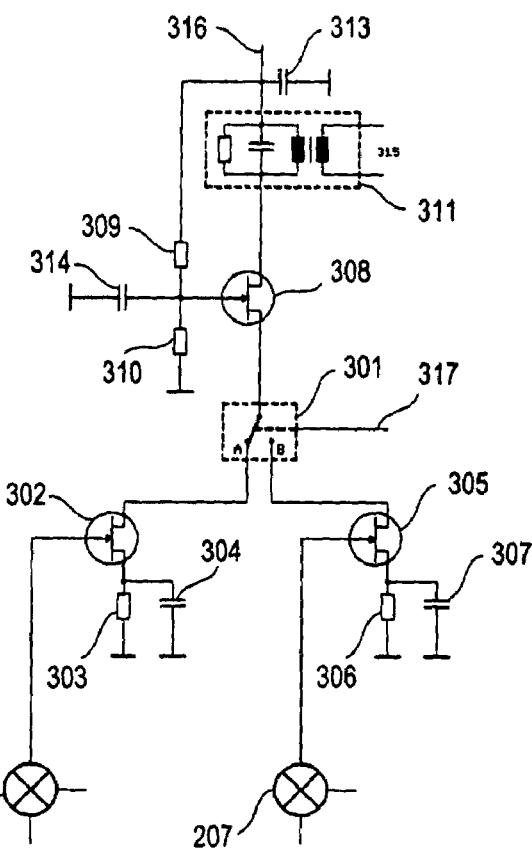
FIG. 3a shows a diagrammatic view of a circuit for changing over between the two intermediate-frequency signals.

FIG. 3a shows a diagrammatic view of a circuit for switching between the two intermediate-frequency signals. Since the outputs of the two mixers are highly resistive, and thus sensitive to interference, it is recommended that switching be carried out after a first transistor stage.

Normally, so-called cascode amplifiers comprising two field effect transistors (FET) are used as intermediate-frequency amplifiers. If a separation between these two FETs is made and a changeover switch is inserted at that position, the circuit shown in FIG. 3a results.

In order to measure the reference pulse, the changeover switch 301 closes by way of the control line 317 to the contact A, thus forming a cascode amplifier from the two transistors 302 and 308 together with the resonance circuit 311, which is tuned for the intermediate frequency. The resistors 303, 309 and 310 are used for setting the direct-current operating point of the amplifier; the two capacitors 304, 313 and 314 are present for blocking alternating-current signals.

In order to measure the echo signals, the changeover switch 301 is switched to the position B. In this way the cascode is formed by the transistors 305 and 308 together with the resonance circuit 311. The resistors 306, 309 and 310 are again used to set the direct-current operating point of the amplifier, and the capacitors 307, 313 and 314 are used for blocking off alternating-current signals.

The supply voltage is connected to 316; the output 315 of the amplifier can be fed to the analog-digital converter.

This arrangement may be associated with advantages in that it may be significantly less susceptible to interference when compared to a changeover switch directly on the two mixers 206 and 207. The advantage when compared to two completely separate amplifiers may arise in that the two signal paths may pass through the same intermediate-frequency filter (resonance circuit 311) and consequently may be subject to the same filter fluctuations. Furthermore, the expenditure for filter balancing may be reduced, and the circuit may require a smaller printed circuit board area than do two complete amplifiers.

Figure 4:
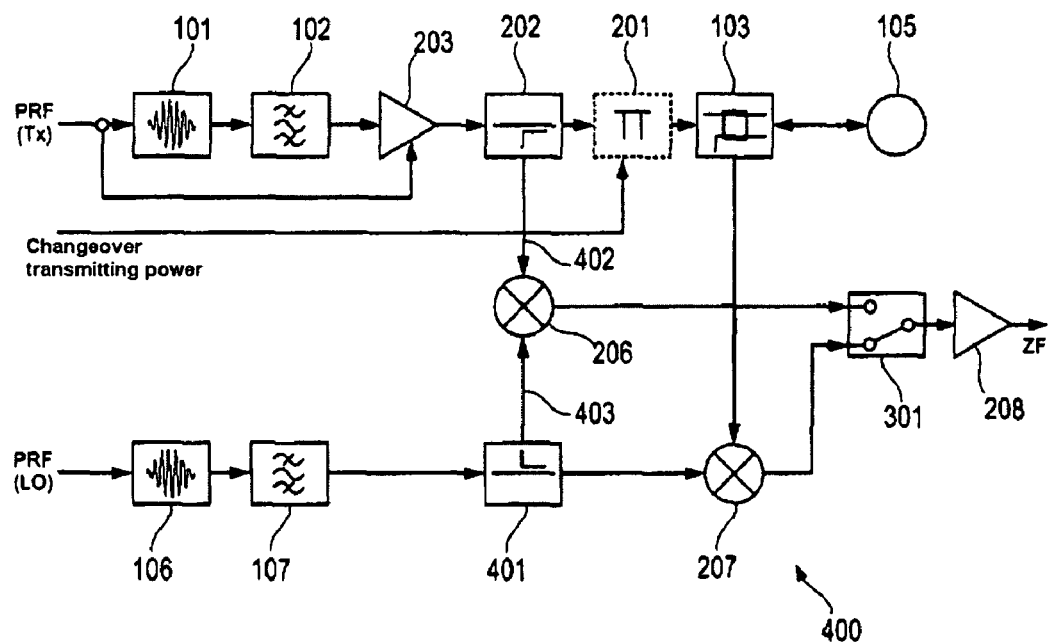
FIG. 4 shows a block diagram of a microwave module according to a further exemplary embodiment of the present invention.

FIG. 4 shows a further variant of a microwave module 400, in which the reference pulse downstream of the transmission amplifier 203 is decoupled by way of a directional coupler 202. In this example by way of the coupling attenuation devices of the two directional couplers 202, 401 the reference pulse 402 can be selected so as to be sufficiently large, and the actual sampling pulse 403 can be selected so as to be correspondingly small, for sampling to be quasi reversed, i.e. so that the decoupled part 402 of the transmission pulse samples the decoupled part 403 of the sampling pulse.

This provides advantages in that the transmission amplifier 203, which is present anyway, generates enough power, and thus the decoupled signal 402 provides a level large enough to turn on the first sampling mixer 206. There may thus be no need to provide an amplifier in the sampling branch.

This variant is distinguished by particularly low current consumption because only one amplifier 203 is used.

Figure 5:
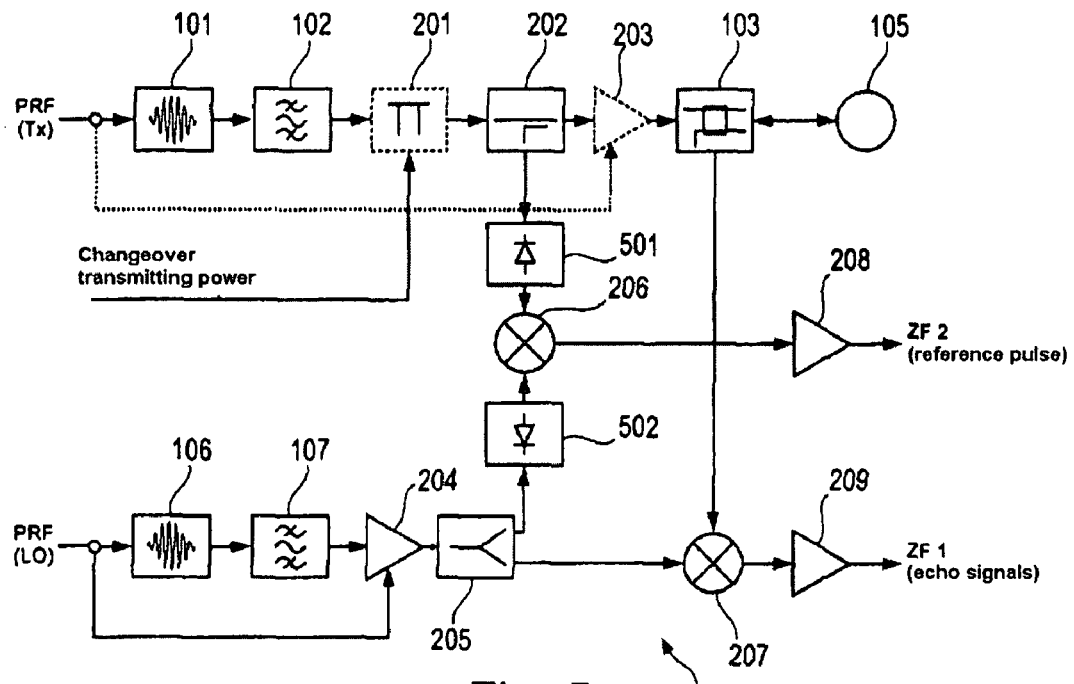
FIG. 5 shows a block diagram of a microwave module according to a further exemplary embodiment of the present invention.

FIG. 5 shows a block diagram of a microwave module 500 according to a further exemplary embodiment of the present invention. In this arrangement, as is the case in the version shown above, generating the reference pulse consists of decoupling part of the transmission signal, and subsequently rectifying it with a detector 501. By means of a sampling signal, which has also been rectified with a second detector 502, said signal can subsequently be converted, in a sampling mixer 206, to a sweep-magnified signal. However, it should be noted that the reference pulse is already present as an envelope and can thus no longer be directly combined with the echo signals. There is an advantage in that this may result in a simpler design of the sampling mixer 206 and of the intermediate-frequency amplifier 208.

Figure 6:
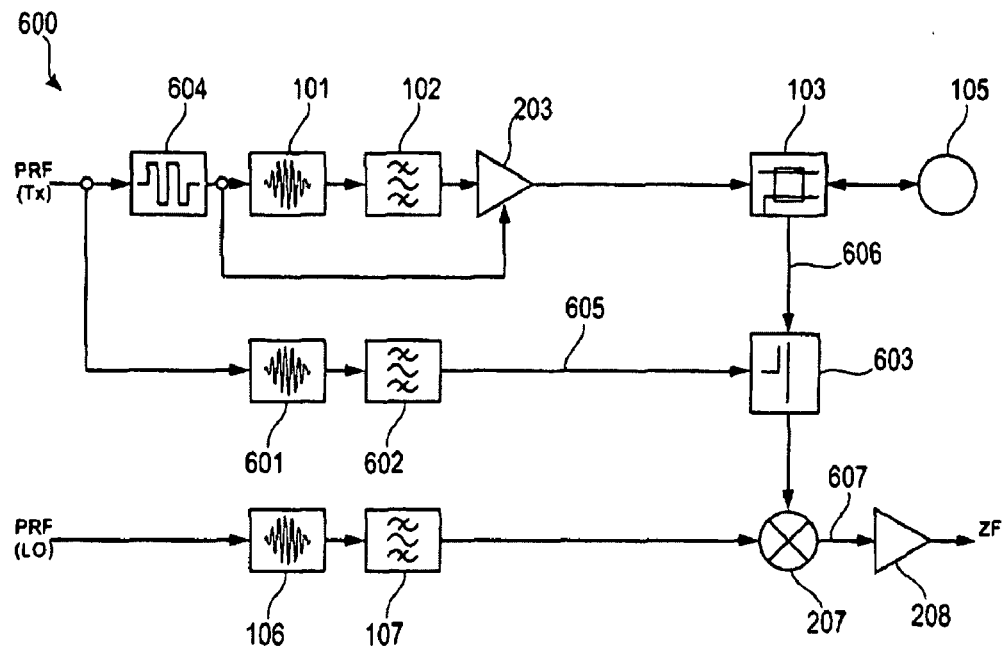
FIG. 6 shows a block diagram of a microwave module according to a further exemplary embodiment of the present invention.

FIG. 6 shows a further exemplary embodiment of a microwave module 600 that comprises a delay line 604, an additional pulse generator 601 with a filter 602, and a directional coupler 603.

In this arrangement the reference pulse is generated with the use of the second microwave generator 601. The reference pulse generated in the pulse generator 601 is filtered in the filter 602 and by means of the directional coupler 603 is fed to the receiver. In this arrangement both microwave generators 101, 601 for the transmission- and reference pulse respectively are of identical design and are controlled by an identical pulse repetition rate (PRF) signal. In this arrangement the PRF signal for the transmission pulse generator 101 is delayed in a delay line 604 until the reference pulse has been sampled in the sampling mixer 207. As a result of this an intermediate-frequency signal 607 arises at the mixer outlet, which intermediate-frequency signal comprises the reference pulse 605 and the echo signal 606. Both signals have been sufficiently separated in time for the reference pulse 605 to be able to be evaluated without the influence of interference.

However, the above is based on the two pulse generators 101, 601 behaving identically over time and with progressive ageing, which with identical designs will be the case. The requirements concerning the delay line 604 are relatively modest because the frequency of the PRF is only in the region of some MHz. Consequently, said delay line 604 can be designed as a simple line in a multilayer printed circuit board made of FR4 (glass-fibre reinforced epoxy resin).

Figure 7:
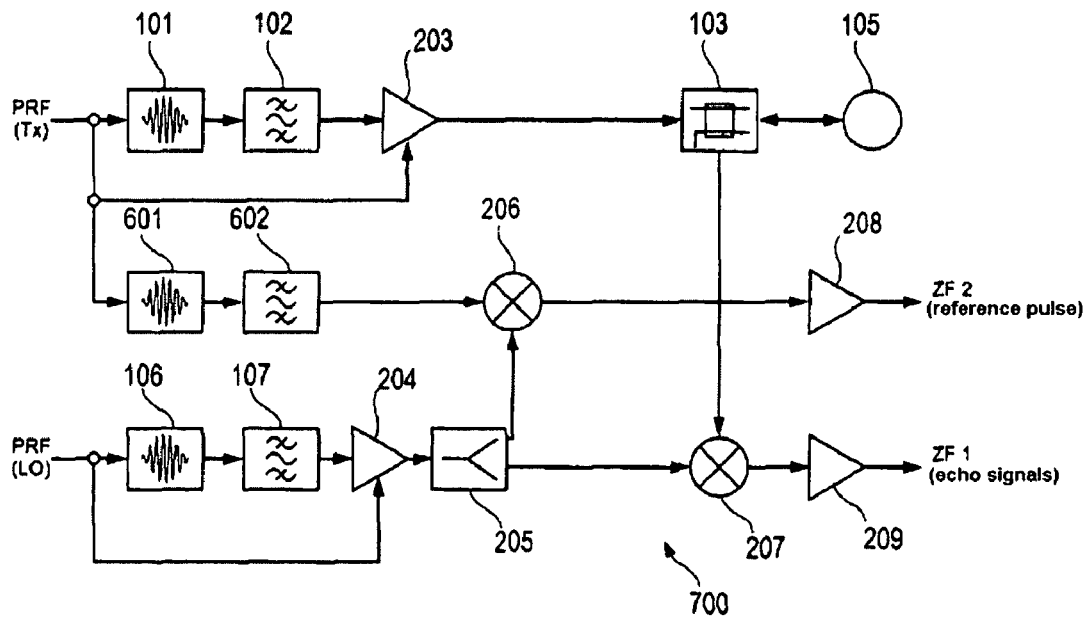
FIG. 7 shows a block diagram of a microwave module according to a further exemplary embodiment of the present invention.

FIG. 7 shows a microwave module 700 according to a further exemplary embodiment of the present invention. In this arrangement the reference pulse is generated in that the signal of the second pulse generator 601 is sampled with a sampling mixer 206 of its own, and corresponding to the manner shown in FIGS. 2, 3 and 4 is further processed in separate channels or together in one channel.

Figure 8:
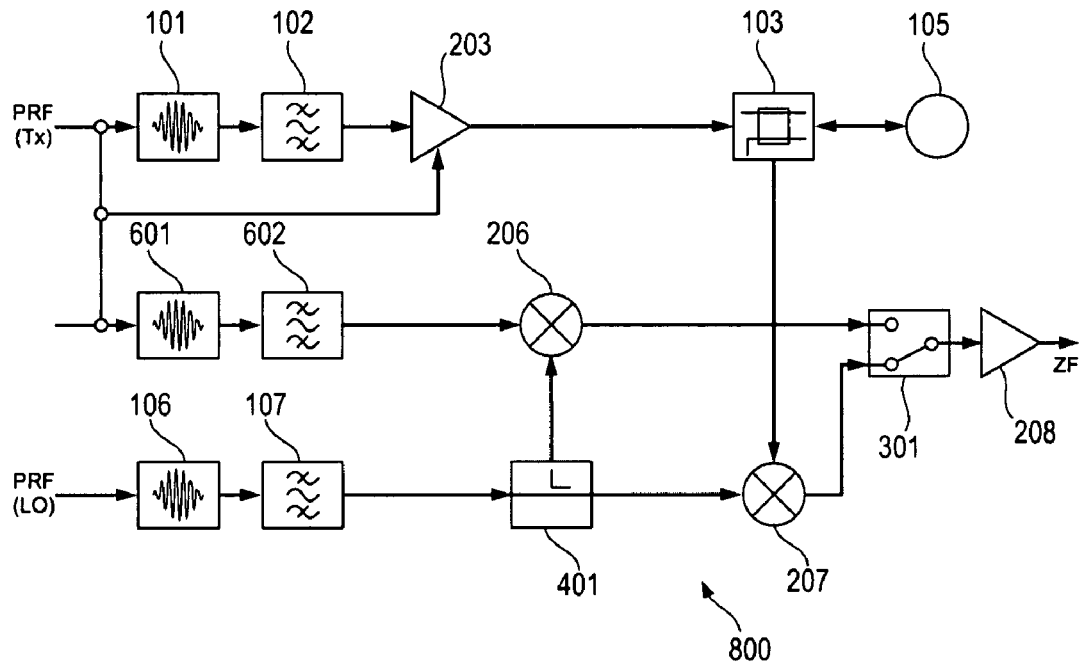
FIG. 8 shows a block diagram of a microwave module according to a further exemplary embodiment of the present invention.

FIG. 8 shows a further exemplary embodiment of a microwave module 800 in which instead of the power divider 205 (see FIG. 7) a directional coupler 401 is provided. In this arrangement the reference pulse and the echo signal are further processed in a single channel.

Figure 9:
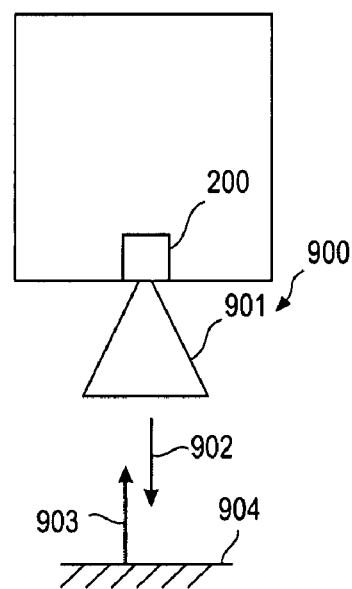
FIG. 9 shows a diagrammatic view of a fill level radar according to an exemplary embodiment of the present invention.

FIG. 9 shows a diagrammatic view of a fill level radar according to a further exemplary embodiment of the present invention.

In this arrangement the fill level radar 900 comprises an antenna 901 and one of the microwave modules described above, for example module 200. The antenna 901 is designed to emit electromagnetic radiation 902 to the surface 904 of the product contained in a container, and to receive electromagnetic radiation 903 reflected from the surface 904 of the product contained in the container.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A microwave module for an independent reference pulse generation for a fill-level measuring device, comprising:
an echo signal unit providing an echo signal;
a reference-pulse generating unit generating a reference pulse, the reference-pulse generating unit including a first sampling mixer, the first sampling mixer converting a reference signal to the reference pulse in the form of a second intermediate-frequency signal;
a sampling pulse generator generating a sampling pulse;
a second sampling mixer situated in the echo signal unit, the second sampling mixer converting a receiving signal and the sampling pulse to the echo signal in the form of a first intermediate-frequency signal;
an intermediate-frequency amplifier; and
a changeover switch transmitting the first intermediate-frequency signal and the second intermediate-frequency signal to the intermediate-frequency amplifier,
wherein the reference pulse and the echo signal are signals that are separate from each other.

2. The microwave module according to claim 1, further comprising:
a first drawing-off device situated in the reference-pulse generating unit;
wherein the first drawing-off device decouples the reference signal from a transmission path for a transmission signal between a first oscillator and one of (a) an antenna and (b) a probe.

3. The microwave module according to claim 2, further comprising:
a first amplifier amplifying the transmission signal, the first amplifier being arranged downstream of the first drawing-off device in the transmission path.

4. The microwave module according to claim 2, further comprising:
a second drawing-off device distributing the sampling pulse to the first and second sampling mixers,
wherein the first amplifier is arranged upstream of the first drawing-off device in the transmission path.

5. The microwave module according to claim 4, wherein the first and second drawing-off devices are directional couplers.

6. The microwave module according to claim 4, wherein the first and second drawing-off devices are hybrid couplers.

7. The microwave module according to claim 1, further comprising:
an adjustable attenuation device varying the transmitting power of the transmission signal, the adjustable attenuation device being arranged in the transmission path.

8. The microwave module according to claim 1, further comprising:
a power divider distributing a sampling pulse to the first and second sampling mixers.

9. The microwave module according to claim 1, further comprising:
a first memory storing the echo signal; and
a second memory being separated from the first memory, the second memory storing the reference pulse.

10. The microwave module according to claim 9, wherein the reference pulse and the echo signal are stored in the same memory and wherein the echo signal is masked at a position of the reference pulse, and is replaced by the reference pulse.

11. The microwave module according to claim 1, further comprising:
two transistors of a cascode amplifier;
wherein the changeover switch is arranged between the two transistors.

12. The microwave module according to claim 1, further comprising:
a first rectifier rectifying the decoupled reference signal; and
a second rectifier rectifying the sampling pulse;
wherein the first and second rectifiers are arranged upstream of the first sampling mixer.

13. The microwave module according to claim 12, wherein the first and second rectifiers are detectors.

14. The microwave module according to claim 1, further comprising:
a second oscillator generating the reference pulse; and
a delay device delaying the transmission signal on its way to one of the antenna and the probe.

15. The microwave module according to claim 14, wherein the delay device is a simple line in a multilayer printed circuit board.

16. A fill-level measuring device for determining a fill level in a tank, comprising:
a microwave module and an antenna including (a) an echo signal unit providing an echo signal, (b) a reference-pulse generating unit generating a reference pulse, the reference-pulse generating unit including a first sampling mixer, the first sampling mixer converting a reference signal to the reference pulse in the form of a second intermediate-frequency signal, (c) a sampling pulse generator generating a sampling pulse, (d) a second sampling mixer situated in the echo signal unit, the second sampling mixer converting a receiving signal and the sampling pulse to the echo signal in the form of a first intermediate-frequency signal, (e) an intermediate-frequency amplifier, and (f) a changeover switch transmitting the first intermediate-frequency signal and the second intermediate-frequency signal to the intermediate-frequency amplifier,
wherein the reference pulse and the echo signal are signals that are separate from each other.

17. A method for independently generating a reference pulse for a fill-level measuring device, comprising:
providing an echo signal by generating a sample pulse and converting a receiving signal and the sampling pulse to the echo signal in the form of a first intermediate-frequency signal;
generating a reference pulse using a sampling mixer, the first sampling mixer converting a reference signal to the reference pulse in the form of a second intermediate-frequency signal; and
transmitting, by means of a changeover switch, the first intermediate-frequency signal and the second intermediate-frequency signal to the intermediate-frequency amplifier,
wherein the reference pulse and the echo signal are signals that are separate from each other.

18. A microwave module for an independent reference pulse generation for a fill-level measuring device, comprising:
an echo signal unit providing an echo signal;
a reference-pulse generating unit generating a reference pulse, the reference-pulse generating unit including a separate oscillator solely generating the reference pulse;
a sampling pulse generator generating a sampling pulse; and
a second sampling mixer situated in the echo signal unit, the second sampling mixer convening a receiving signal and the sampling pulse to the echo signal,
wherein the reference pulse and the echo signal are signals that are separate from each other.

* * * * *